(12) United States Patent
Suzuki

(10) Patent No.: US 7,757,735 B2
(45) Date of Patent: Jul. 20, 2010

(54) PNEUMATIC TIRE HAVING BUTTRESS PART

(75) Inventor: Kazuya Suzuki, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 858 days.

(21) Appl. No.: 11/507,542

(22) Filed: Aug. 22, 2006

(65) Prior Publication Data

US 2007/0056664 A1 Mar. 15, 2007

(30) Foreign Application Priority Data

Sep. 15, 2005 (JP) ............................. 2005-268056

(51) Int. Cl.
B60C 11/01 (2006.01)
B60C 11/03 (2006.01)
B60C 11/12 (2006.01)

(52) U.S. Cl. .............................. 152/209.3; 152/209.15; 152/209.16; 152/DIG. 3

(58) Field of Classification Search ............. 152/209.2, 152/209.3, 209.15, 209.16, 523, DIG. 3, 152/902

See application file for complete search history.

(56) References Cited

U.S. PATENT DOCUMENTS

| | | | | |
|---|---|---|---|---|
| 3,253,635 | A | * | 5/1966 | Travers ........................ 152/523 |
| 4,055,209 | A | * | 10/1977 | Senger .................... 152/209.16 |
| 5,353,854 | A | * | 10/1994 | Landers et al. .......... 152/DIG. 3 |
| 5,824,169 | A | * | 10/1998 | Landers et al. .......... 152/DIG. 3 |
| 2003/0140997 | A1 | * | 7/2003 | Suzuki ..................... 152/209.3 |

FOREIGN PATENT DOCUMENTS

| | | | |
|---|---|---|---|
| DE | 3247465 | * | 6/1984 |
| EP | 508091 | * | 10/1992 |
| EP | 591002 | * | 4/1994 |
| EP | 0 612 631 | A1 | 8/1994 |
| EP | 612631 | * | 8/1994 |
| EP | 788899 | * | 8/1997 |

(Continued)

OTHER PUBLICATIONS machine translation for Japan 07-228109 (no date).*

(Continued)

Primary Examiner—Steven D Maki
(74) Attorney, Agent, or Firm—Birch, Stewart, Kolasch & Birch, LLP

(57) ABSTRACT

A pneumatic tire has longitudinal grooves formed continuously in a circumferential direction of the pneumatic tire in a region of a buttress part disposed between a tread part and a sidewall part; a plurality of transverse grooves formed continuously with the longitudinal grooves in the above-described region of the buttress part in an axial direction of the pneumatic tire, with the transverse grooves spaced at certain intervals in the circumferential direction of the pneumatic tire; and a concave portion formed in each of a plurality of blocks surrounded with the longitudinal grooves and the transverse grooves, with the concave portion extended in the circumferential direction of the pneumatic tire. The above-described region of the buttress part is adjacent to a periphery of an end of a contact surface of the tread part. The number of the concave portions is varied according to a circumferential length of each of the blocks.

3 Claims, 4 Drawing Sheets

FOREIGN PATENT DOCUMENTS

| | | | |
|---|---|---|---|
| GB | 2 376 217 A | | 12/2002 |
| JP | 04-201610 | * | 7/1992 |
| JP | 6-87303 A | | 3/1994 |
| JP | 07-228109 | * | 8/1995 |
| JP | 07-237409 | * | 9/1995 |
| JP | 2003-54221 A | | 2/2003 |
| JP | 2004-203299 A | | 7/2004 |

OTHER PUBLICATIONS machine translation for German 3,247,465 (no date).*
machine translation for Europe 788899 (no date).*
machine translation for Japan 07-237409 (no date).*

* cited by examiner

PNEUMATIC TIRE HAVING BUTTRESS PART

This nonprovisional application claims priority under 35 U.S.C. §119(a) on Patent Application No(s). 2005-268056 filed in Japan on Sep. 15, 2005, the entire contents of which are hereby incorporated by reference.

FIELD OF THE INVENTION

The present invention relates to a pneumatic tire and more particularly to a pneumatic tire having an improved construction of concave portions formed in blocks of a buttress part disposed between a tread part of the pneumatic tire and a sidewall part thereof to improve the operation-stabilizing performance of a vehicle and the comfortable ride-giving performance thereof.

DESCRIPTION OF THE RELATED ART

In this kind of the pneumatic tire, the concave portion is formed in blocks serving as pattern-constructing elements to improve the design for making the buttress part look fine, improve the operation-stabilizing performance and the comfortable ride-giving performance by adjusting the degrees of the rigidity of the blocks. Another object of the formation of the concave portion in blocks is to allow an air exhaust function to be displayed to prevent manufacture of a defective tire so that bares are prevented from being generated on the tire by residual air in vulcanizing and molding operations.

In view of the above-described situation and the improvement of the design of the buttress part, there are proposed a large number of pneumatic tires on which concave portions having different configurations are formed in the blocks (see patent documents 1 through 3).

Patent document 1: Japanese Patent Application Laid-Open No. 6-87303

Patent document 2: Japanese Patent Application Laid-Open No. 2003-54221

Patent document 3: Japanese Patent Application Laid-Open No. 2004-203299

In the conventional pneumatic tires described in the patent documents 1 through 3, as shown in FIG. 6, irrespective of the dimension of the block 13, and specifically, irrespective of the circumferential length thereof, an equal number of concave portions 14 is formed in each block 13. For example, one concave portion 14 or a plurality of concave portions 14 is formed in each block 13. Further the ratio of the length of the concave portion 14 in the circumferential direction of the pneumatic tire to the length of the block 13 in the circumferential direction thereof is set equally. Consequently the pneumatic tires described in the patent documents 1 through 3 are incapable of accommodating variations in the degrees of the rigidity of the blocks 13. The variations occur according to the difference in the lengths of the blocks in the circumferential direction thereof. Thereby the pneumatic tires have blocks, having a high flexibility and a low flexibility in the circumferential direction thereof, which are formed in the buttress part thereof. Thus these pneumatic tires have a problem that they generate nonuniformity in each of the operation-stabilizing performance and the comfortable ride-giving performance during the travel of a vehicle.

SUMMARY OF THE INVENTION

The present invention has been made in view of the above-described problems. Therefore it is an object of the present invention to provide a pneumatic tire capable of improving its operation-stabilizing performance and comfortable ride-giving performance without deteriorating the design for making the buttress part look fine and the function of preventing the pneumatic tire from becoming defective in vulcanizing and molding operations by effectively disposing concave portions in blocks formed in the buttress part in correspondence to the dimension of each block.

To solve the above-described problems, the present invention provides a pneumatic tire having a plurality of longitudinal grooves formed continuously in a circumferential direction of the pneumatic tire in a region of a buttress part disposed between a tread part and a sidewall part, wherein the above-described region is adjacent to a periphery of an end of a contact surface of the tread part; a plurality of transverse grooves formed continuously with the longitudinal grooves in the region of the buttress part in an axial direction of the pneumatic tire, with the transverse grooves spaced at certain intervals in the circumferential direction of the pneumatic tire and extended to the tread part; and a concave portion formed proximately to the longitudinal grooves in each of the blocks surrounded with the longitudinal grooves and the transverse grooves, with the concave portion extended in the circumferential direction of the tire. The number of the concave portions is varied according to a circumferential length of each of the blocks.

The range of the circumferential length of the total of the concave portions formed in each of the blocks may be nonuniform, but preferably uniform.

It is possible to form a smaller number of the concave portions in the block whose circumferential length is long. Conversely it is possible to form a larger number of the concave portions in the block whose circumferential length is short.

It is preferable that the width of each of the concave portions formed in each block is set to the range of 1 to 6 mm in the axial direction of the pneumatic tire.

The depth of each of the concave portions formed in each block is set equally or changed in the circumferential direction of the pneumatic tire.

As described above, the number of the concave portions formed in each block serving as the pattern-constructing element that forms circumferentially successive pitches is varied according to the circumferential length of each block. This construction is capable of accommodating variations in the degrees of the rigidity of the blocks which result from the presence of the concave portions formed to accomplish the design for making the buttress part look fine and the air exhaust function necessary for preventing the tire from becoming defective in vulcanizing and molding operations.

Thereby although the blocks having different circumferential lengths are present on the circumference of the tire, the degrees of the flexibility of the blocks are made uniform or almost uniform. Thus this construction allows the tire to have improved operation-stabilizing performance and comfortable ride-giving performance during the travel of a vehicle.

It is preferable that the circumferential length between both outer ends of each of the concave portions formed in each block is set to not less than 50% nor more than 95% of a circumferential length of each of the blocks. Particularly in a block whose circumferential length is not less than an average value of circumferential lengths of all of the blocks, a circumferential length between both outer ends of each of the concave portions formed in the block is set to not less than 80% nor more than 90% of the circumferential length of the block, whereas in a block whose circumferential length is less than the average value of the circumferential lengths of all of the blocks, a circumferential length between both outer ends of each of the concave portions formed in the block is set to not less than 50% less than 80% of the circumferential length of the block.

As described above, the ratio of the circumferential length between both outer ends of each of the concave portions formed in each block to the circumferential length of each block is set not at an equal ratio but at an unequal ratio. This construction reduces variations in the degrees of the rigidity of the blocks and allows the tire to have improved operation-stabilizing performance and comfortable ride-giving performance during the travel of the vehicle.

It is preferable that in a block in which a plurality of concave portions is formed, the concave portions are shifted in the axial direction of the pneumatic tire.

This construction accommodates variations in the degrees of the rigidity of the blocks in a comparatively wide range including the circumferential and widthwise directions of the blocks, thereby allowing the degrees of the flexibility in the buttress part to be uniform and the tire to have improved operation-stabilizing performance and comfortable ride-giving performance during the travel of the vehicle.

As apparent from the foregoing description, in forming the concave portion effective for accomplishing the design for making the buttress part look fine and preventing the tire from becoming defective in vulcanizing and molding operations in blocks formed successively in the circumferential direction of the pneumatic tire, the construction of the present invention accommodates variations in the degrees of the rigidity of the blocks by changing the number of the concave portions according to the circumferential length of each block. Thereby the construction of the present invention is capable of making the degrees of the flexibility in the blocks uniform or almost uniform.

Thereby unlike the conventional pneumatic tire having an equal number of the concave portions formed in each block, without deteriorating the design of the buttress part that does not contact a plane surface when the pneumatic tire contacts the plane surface by applying a normal load to the pneumatic tire having a normal internal pressure applied thereto and the function of preventing the pneumatic tire from becoming defective in vulcanizing and molding operations, the construction makes the degrees of the flexibility of the entire circumference of the buttress part uniform, thus allowing the tire to have improved operation-stabilizing performance and comfortable ride-giving performance during the travel of the vehicle.

The ratio of the circumferential length between both outer ends of each of the concave portions formed in each block to the circumferential length of each block is set not at an equal ratio but at an unequal ratio. This construction reduces variations in the degrees of the rigidity of the blocks and allows the tire to have improved operation-stabilizing performance and comfortable ride-giving performance during the travel of the vehicle.

In the block in which a plurality of concave portions is formed, the concave portions are disposed zigzag by shifting them in the axial direction of the pneumatic tire. This construction accommodates variations in the degrees of the rigidity of the blocks in a comparatively wide range including the circumferential and widthwise directions of the blocks, thereby allowing the degrees of the flexibility in the buttress part to be uniform and the tire to have improved operation-stabilizing performance and comfortable ride-giving performance during the travel of the vehicle.

DETAILED DESCRIPTION OF THE PREFERRED EMBODIMENTS

The pneumatic tire of the embodiments of the present invention will be described below with reference to drawings.

Figure 1:
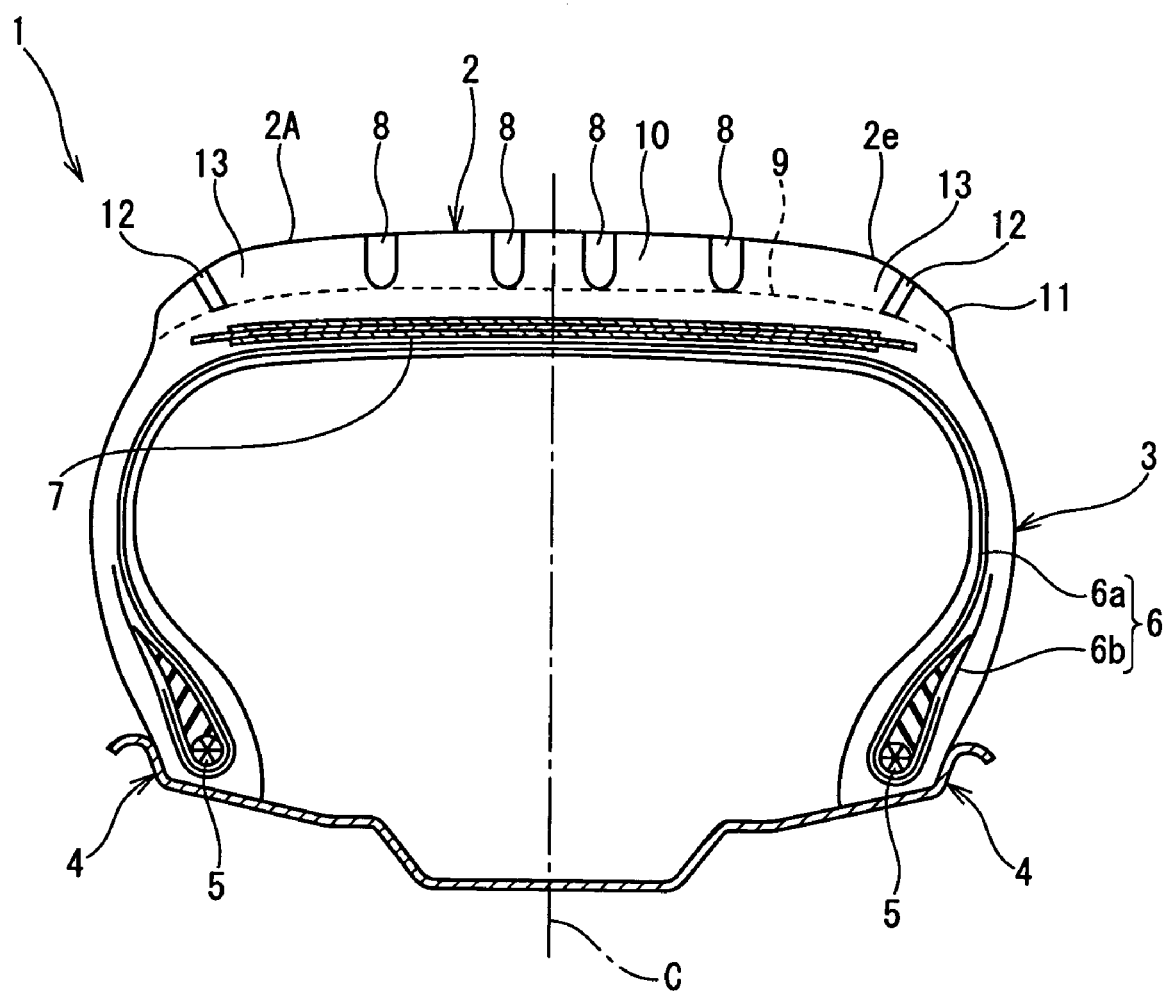
FIG. 1 is an axial sectional view showing a pneumatic tire of a first embodiment of the present invention.

As shown in FIG. 1 which is an axial sectional view showing the pneumatic tire of the first embodiment of the present invention and in FIG. 2 which is a partly enlarged plan view showing the tread pattern of the pneumatic tire, the pneumatic tire 1 (hereinafter often referred to as merely tire) of the first embodiment is constructed of a tread part 2, a sidewall part 3 extended from both ends of the tread part 2 toward an inner side of the tire in the radial direction thereof, and a bead part 4 connected with an inner end of the sidewall part 3 in the radial direction thereof.

The tire 1 has a carcass 6 composed of a body portion 6a extended from the tread part 2 to the bead part 4 through the sidewall part 3. The carcass 6 is folded back about a bead core 5 of the bead part 4 in a direction from an inner side of the tire 1 toward an outer side thereof in the axial direction thereof. The tire 1 further includes a reinforcing belt layer 7 disposed from the inside of the tread part 2 to the outer side of the carcass 6 in the radial direction of the tire 1.

The carcass 6 has one or a plurality of carcass cords 6b, radially or semi-radially arranged, which incline at 60 to 90° to an equator C of the tire. As the carcass cord, cords of organic fibers such as nylon, rayon, polyester, aromatic polyamide fiber or the like are used.

The reinforcing belt layer 7 consists of a plurality of belt plies (three belt plies are shown in FIG. 1, but not less than two belt plies are required). As the belt plies, belt cords consisting of organic fibers such as nylon, rayon, polyester, aromatic polyamide fiber or the like similarly to the carcass cords 6b and inorganic fibers such as steel cords are used by inclining them 10 to 90° to the equator C of the tire 1 and disposing adjacent belt cords in intersecting directions.

On a contact surface 2A of the tread part 2, there are formed a plurality of longitudinal grooves 8 (four longitudinal grooves 8 are formed in the first embodiment) extended continuously in the circumferential direction A of the tire 1; and a plurality of transverse grooves 9 extended in the axial direction of the tire 1 at certain intervals in the circumferential direction A of the tire 1, with the transverse grooves 9 being continuous with the longitudinal grooves 8 and connecting the adjacent longitudinal grooves 8, 8 to each other and connecting the longitudinal grooves 8 and an end 2e of the contact surface 2A of the tread part 2 to each other. A large number of blocks 10 is formed on the contact surface 2A of the tread part 2, with the blocks 10 surrounded with the longitudinal grooves 8 and the transverse grooves 9 to form center block pattern groups 15a, 15b in the circumferential direction A of the tire 1, with the center block pattern groups 15a, 15b arranged side by side in a widthwise direction W of the tire 1.

Longitudinal grooves 12 narrower than the longitudinal grooves 8 are formed continuously in the circumferential direction of the tire 1 in a region of a buttress part 11, adjacent to the outside of the end 2e of the contact surface 2A of the tread part 2, which is disposed between the tread part 2 and the sidewall part 3. More specifically, the longitudinal grooves 12 are formed in a region of the tire 1 that does not contact a plane surface when the tire 1 contacts a plane surface by applying a normal load to the tire 1 having a normal internal pressure applied thereto. The transverse grooves 9 are extended to positions at which the transverse grooves 9 are continuous with the longitudinal grooves 12 respectively.

Figure 3:
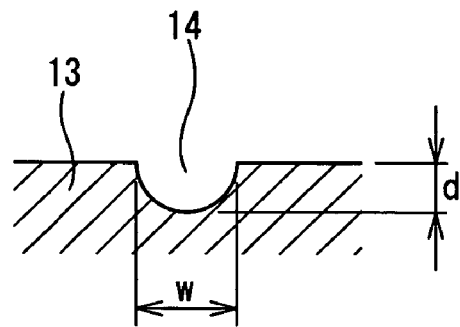
FIG. 3 is an enlarged vertical sectional view showing main portions of the pneumatic tire of the first embodiment of the present invention.

A large number of blocks 13 is formed, with the blocks 13 surrounded with the narrow longitudinal groove 12, the longitudinal grooves 8 of the tread part 2 and the transverse grooves 9 thereof to form a side block pattern 15c in the circumferential direction A of the tire 1, with the side block pattern 15c disposed at both sides in the widthwise direction W of the tire 1. Concave portions 14 are formed on the outer surface of each block 13 serving as the element constituting the side block pattern 15c by extending the concave portions 14 in the circumferential direction A of the tire 1, with the concave portions 14 disposed proximately to the narrow longitudinal grooves 12. As shown in FIG. 3, each concave portion 14 is approximately semicircular in a sectional view.

In the pneumatic tire 1 having the above-described basic construction, the number of the concave portions 14 formed on the outer surface of each block 13 of the side block pattern 15c is varied according to the circumferential length of each block 13.

An example of the side block pattern 15c is described below. When the pneumatic tire 1 is used for a passenger car, the side block pattern 15c is formed by arranging different kinds of pitches such as five kinds of pitches SS, S, M, L, and LL different from one another in the dimensions thereof in the circumferential direction A of the tire 1. According to the dimensions of the pitches, the circumferential lengths of the blocks 13 constituting the side block pattern 15c are different from one another. According to the circumferential length of the block 13, the number of the concave portions 14 (number of dividing) formed in the block is varied.

Figure 2:
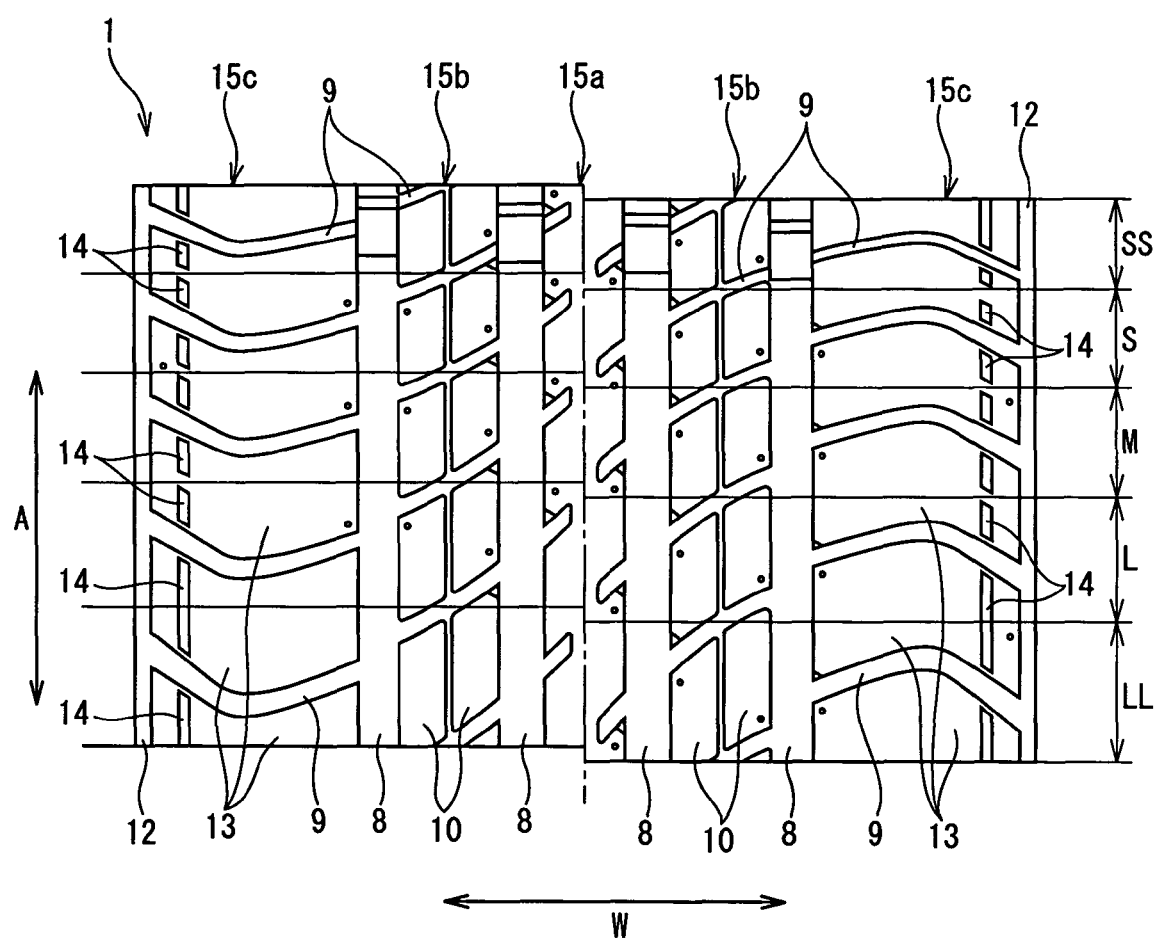
FIG. 2 is a partly enlarged plan view showing a tread pattern of the pneumatic tire of the first embodiment of the present invention.

As shown in FIG. 2, the side block pattern 15c of the pneumatic tire 1 of the first embodiment has the five kinds of pitches SS, S, M, L, and LL. According to the dimensions of the pitches, the circumferential lengths of the blocks 13 are different from one another, as shown with L1 through L5. That is, one concave portion 14 is formed in two blocks 13 whose circumferential lengths shown with L1, L2 are long, whereas two concave portions 14 are formed in three blocks 13 whose circumferential lengths shown with L3 through L5 are short.

Figure 4:
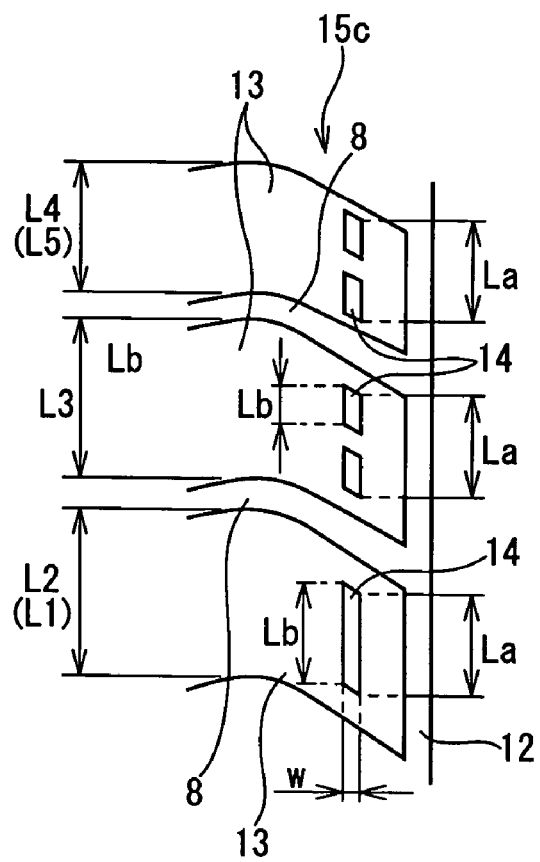
FIG. 4 is an enlarged plan view showing the main portions of the pneumatic tire of the first embodiment of the present invention.

As shown in FIG. 4, a range La of the circumferential length of the total of the concave portions 14 formed in each block 13 is uniform irrespective of the number of the concave portions 14. A width w of each of the concave portions 14 is set to the range of 1 to 6 mm in the axial direction thereof. A depth d (see FIG. 3) of each of the concave portions 14 is set to equally 1 mm, but may be changed in the circumferential direction of the tire 1.

A circumferential length Lb between both outer ends of the concave portion 14 formed in each block 13 is set to not less than 50% nor more than 95% of the circumferential length of the block 13.

For example, in the first embodiment, an average value of LA of the circumferential lengths of the blocks 13 is: LA= (L1+L2+L3+L4+L5)/5. In the block 13 whose circumferential length is not less than LA, the above-described length Lb is set to not less than 80% nor more than 90% of the circumferential length of the block 13, whereas in the block 13 whose circumferential length is less than LA, the above-described length Lb is set to not less than 50% less than 80% of the circumferential length of the block 13.

In the pneumatic tire 1 of the first embodiment having the above-described construction, the number of the concave portions 14 formed in the block 13 serving as the element constituting the side block pattern 15c disposed in the region of the buttress part 11 adjacent to the outside of the end 2e of the contact surface 2A of the tread part 2 is varied according to the circumferential length of the block 13. This construction does not deteriorate but maintains the design for making the buttress part look fine and the air exhaust function necessary for preventing the tire 1 from becoming defective in vulcanizing and molding operations and is capable of accommodating variations in the degrees of the rigidity of the blocks 13 which result from the presence of the concave portions 14. Thereby although the blocks 13 having different circumferential lengths are present on the circumference of the tire 1, the degrees of the flexibility of the blocks 13 are made uniform or almost uniform in the circumferential direction of the tire 1. Thus this construction allows the tire 1 to have improved operation-stabilizing performance and comfortable ride-giving performance during the travel of the vehicle.

Figure 5:
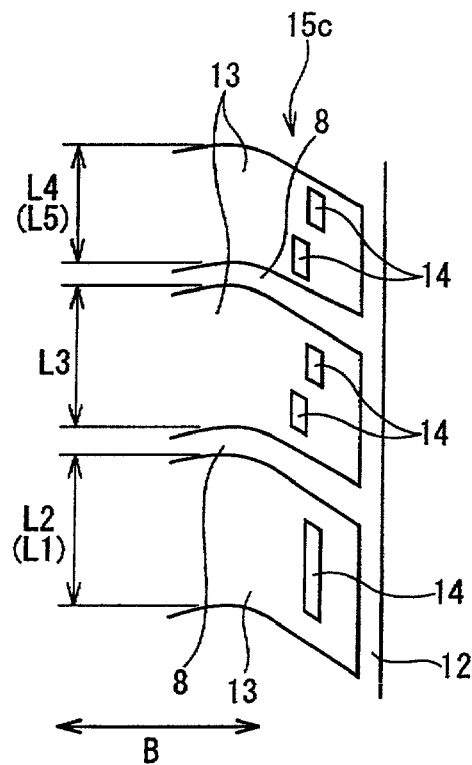
FIG. 5 is a partly enlarged plan view showing a tread pattern of a pneumatic tire of a second embodiment of the present invention.

FIG. 5 shows the second embodiment of the present invention. In the pneumatic tire 1 of the second embodiment, two concave portions 14 formed in each of three blocks 13 whose circumferential lengths L3 through L5 are short are disposed zigzag by shifting them in the axial direction B. Other constructions of the pneumatic tire 1 of the second embodiment, namely, the axial sectional construction of the pneumatic tire 1 and the tread pattern consisting of the center block pattern groups 15a, 15b and the side block pattern 15c are similar to those shown in FIG. 1. Thus the same parts of the second embodiment as those of the first embodiment are denoted by the same reference numerals as those of the first embodiment, and description thereof is omitted herein.

The pneumatic tire 1 of the second embodiment of the present invention having the above-described construction displays the performance similar to that of the pneumatic tire 1 of the first embodiment. Further two concave portions 14 are disposed zigzag by shifting them in the axial direction B. Thus it is possible to accommodate the variation in the rigidities of the blocks 13 in a comparatively wide range in the circumferential and radial directions of the tire 1 and make the flexibility of the buttress part 11 uniform in the circumferential direction of the tire 1. Thereby it is possible to improve the operation-stabilizing performance and the comfortable ride-giving performance during the travel of the vehicle.

In addition to the constructions of the first and second embodiments, conversely to the first embodiment, it is possible to form two or more concave portions 14 on the outer surface of each of two blocks 13 whose circumferential lengths (L1, L2) are long and one concave portion 14 on the outer surface of each of three blocks 13 whose circumferential lengths (L3 through L5) are short.

In the first and second embodiments, each of the center block pattern groups 15a, 15b and the side block pattern 15c has the five kinds of the pitches of SS, S, M, L, and LL. But the center block pattern groups 15a, 15b and the side block pattern 15c may have three kinds of the pitches of S, M, and L and form blocks 13 different from each other in the circumferential lengths thereof according to the lengths of the pitches. Further it is possible to vary the number of the concave portions 14 for each block 13 as necessary.

EXAMPLES

Figure 6:
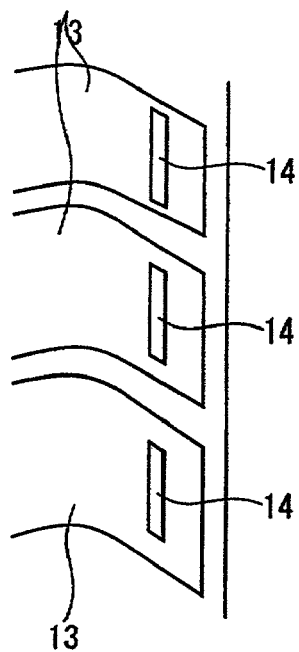
FIG. 6 is a partly enlarged plan view showing a tread pattern of a conventional pneumatic tire (comparison example 1).

Summer tires (examples 1 through 9) were made on an experimental basis: The tires had the construction shown in FIGS. 1 and 2, three kinds of pattern pitches S, M, and L, and a size of 205/60R16. The tires were classified into types A through D in terms of the circumferential length, namely, the ratio of circumferential length of concave portion to circumferential length of block (shown in (a) of table 1); types E through H in terms of the numbers of the concave portions (shown in (b) of table 1); and types I through L in terms of the radial dispositions of a plurality of the concave portions (shown in (c) of table 1). An FF vehicle of 2000 cc on which the summer tires were mounted was traveled on a road to examine the operation-stabilizing performance and the comfortable ride-giving performance. Similar tests were conducted on the conventional summer tire (comparison example 1) having the same construction and specification as those shown and on summer tires (comparison examples 2 through 5) having constructions other than the construction of the tire of the present invention, shown in FIG. 6. The performances were compared with one another to evaluate them. Table 2 shows the test results.

TABLE 1

Type A

Pitch: S, 90%
Pitch: M, 90%
Pitch: L, 90%
Type B

Pitch: S, 80%
Pitch: M, 80%
Pitch: L, 80%

TABLE 1-continued

Type C

Pitch: S, 80%
Pitch: M, 90%
Pitch: L, 95%
Type D

Pitch: S, 95%
Pitch: M, 90%
Pitch: L, 80%
Type E

Pitch: S, two concave portions
Pitch: M, two concave portions
Pitch: L, two concave portions
Type F Pitch: S, three concave portions
Pitch: M, three concave portions
Pitch: L, three concave portions
Type G Pitch: S, three concave portions
Pitch: M, two concave portions
Pitch: L, one concave portion
Type H Pitch: S, one concave portion
Pitch: M, two concave portions
Pitch: L, three concave portions
Type I Pitch: S, zigzag
Pitch: M, zigzag
Pitch: L, zigzag
Type J Pitch: S, zigzag
Pitch: M, side by side
Pitch: L, zigzag
Type K Pitch: S, zigzag
Pitch: M, zigzag
Pitch: L, side by side
Type L Pitch: S, side by side
Pitch: M, side by side
Pitch: L, zigzag (a) Type A through D classified in terms of circumferential length of concave portion
(b) Type E through H classified in terms of number of concave portion in circumferential direction
(c) Type I through L classified in terms of radial disposition of concave portion

TABLE 2

|  | Comparison Example 1 | Example 1 | Example 2 | Example 3 | Example 4 | Example 5 | Example 6 | Example 7 |
| --- | --- | --- | --- | --- | --- | --- | --- | --- |
| Circumferential length | Uniform, 95% | Type A | Type B | Type C | Type D | Type C | Type C | Type C |
| Number of concave portions in circumferential direction | Not divided | Type G | Type G | Type G | Type G | Type G | Type G | Type G |
| Axial disposition of concave portion | Not disposed | Type K | Type K | Type K | Type K | Type K | Type K | Type K |
| Axial width of concave portion | 2 mm | 2 mm | 2 mm | 2 mm | 2 mm | 1 mm | 3 mm | 5 mm |
| Operation-stabilizing performance | 5 | 4.5 | 5.5 | 6 | 6.5 | 7 | 6 | 4.5 |
| Comfortable ride-giving performance | 5 | 5.5 | 4.5 | 5 | 4.5 | 4.5 | 5.5 | 6 |

TABLE 2-continued

|  | Example 8 | Example 9 | Comparison Example 2 | Comparison Example 3 | Comparison Example 4 | Comparison Example 5 |
|---|---|---|---|---|---|---|
| Circumferential length | Type C | Type C | Type C | Type C | Type C | Type C |
| Number of concave portions in circumferential direction | Type H | Type G | Type E | Type F | Type F | Type F |
| Axial disposition of concave portion | Type K | Type I | Type K | Type K | Type J | Type L |
| Axial width of concave portion | 2 mm | 2 mm | 2 mm | 2 mm | 2 mm | 2 mm |
| Operation-stabilizing performance | 5.5 | 4.5 | 5 | 4.5 | 5 | 5 |
| Comfortable ride-giving performance | 5 | 6 | 5 | 5 | 5 | 5 |

Marks were given to the operation-stabilizing performance and the comfortable ride-giving performance shown in table 2 on the basis of a sensory evaluation. The larger are numerical values, the higher are the operation-stabilizing performance and the comfortable ride-giving performance.

It could be confirmed that the tires of the examples 1 through 9 of the present invention were superior to those of the comparison examples 1 through 5 in the operation-stabilizing performance and the comfortable ride-giving performance or that in the examples 1 through 9, one of the operation-stabilizing performance and the comfortable ride-giving performance was conspicuously improved, keeping the degree of deterioration of the other performance small.

What is claimed is:

1. A pneumatic tire comprising:

a longitudinal narrow groove formed continuously in a circumferential direction of said pneumatic tire in a region of a buttress part disposed between a tread part and a sidewall part, wherein said region is adjacent to a periphery of an end of a contact surface of said tread part;

a plurality of transverse grooves formed to join with said longitudinal narrow groove in said region of said buttress part in an axial direction of said pneumatic tire, with said transverse grooves spaced at certain intervals in said circumferential direction of said pneumatic tire and extended to said tread part; and not less than one concave portion formed proximately to said longitudinal narrow groove in each of said blocks surrounded by said longitudinal narrow groove, said transverse grooves and a longitudinal groove formed in said tread part, with said concave portion extended in said circumferential direction of said tire, wherein the number of said concave portions is varied according to a circumferential length of each of said blocks, a circumferential length between both outermost ends of a concave portion group consisting of said not less than one concave portion formed in each of said blocks is set equally, said circumferential length between both outermost ends is set to not less than 50% nor more than 95% of a circumferential length of each of said blocks, for each block having a circumferential length not less than an average value of circumferential lengths of all of said blocks, said circumferential length between both outermost ends is set to not less than 80% nor more than 90% of said circumferential length of said block, for each block having a circumferential length that is less than said average value of said circumferential lengths of all of said blocks, said circumferential length between both outermost ends is set to not less than 50% and less than 80% of said circumferential length of said block, and in a block in which a plurality of concave portions is formed, said concave portions are shifted in an axial direction of said pneumatic tire.

2. The pneumatic tire according to claim 1, wherein a width of each of said concave portions formed in each block is set in a range of 1 mm to 6 mm in an axial direction of said pneumatic tire.

3. The pneumatic tire according to claim 1, wherein a depth of each of said concave portions formed in each block is set equally or changes in a circumferential direction of said pneumatic tire.

* * * * *